United States Patent [19]

Iseman

[11] Patent Number: 4,704,070
[45] Date of Patent: Nov. 3, 1987

[54] FUEL SYSTEM BUBBLE DISSIPATION DEVICE

[76] Inventor: Walter J. Iseman, Rt. 1, Monroe Center, Ill. 61052

[21] Appl. No.: 767,688

[22] Filed: Aug. 20, 1985

Related U.S. Application Data

[63] Continuation of Ser. No. 488,042, Apr. 25, 1983, abandoned.

[51] Int. Cl.$^4$ .............................................. F04D 9/06
[52] U.S. Cl. ......................................... 417/80; 417/89
[58] Field of Search ................... 417/80, 89; 123/516, 123/514

[56]  References Cited

U.S. PATENT DOCUMENTS

| 2,823,613 | 2/1958 | Leduc | 103/113 |
| 2,901,031 | 8/1959 | Powell | 158/36.4 |
| 3,387,644 | 6/1968 | Heinecke | 103/5 |
| 3,895,885 | 7/1975 | Liberg | 417/80 |
| 4,142,839 | 3/1979 | Davis | 417/89 |

FOREIGN PATENT DOCUMENTS 1416873 12/1975 United Kingdom .................. 417/80

Primary Examiner—Carl Stuart Miller
Attorney, Agent, or Firm—Stanley C. Dalton

[57] ABSTRACT

A fuel system bubble dissipation device wherein fuel is delivered through a fuel line from a fuel tank to an engine. The device includes an ejector having a casing with a fuel flow passage connected into the fuel line and a nozzle extending into said fuel flow passage. The nozzle is supplied with pressurized fuel to induce a higher pressure in the fuel flowing through the ejector. A bubble accumulation chamber is associated with the fuel line and the ejector to provide a reservoir for fuel for passage to the ejector and hold an air bubble separated from and above the fuel and a bubble evacuation passage connects the upper end of the bubble accumulation chamber to the fuel flow passage of the ejector whereby air and vapor can be drawn from the upper end of the bubble accumulation chamber and mixed with fuel flowing through the ejector. The bubble evacuation passage is of a size to control the rate at which air and vapor are drawn from the bubble accumulation chamber.

3 Claims, 1 Drawing Figure

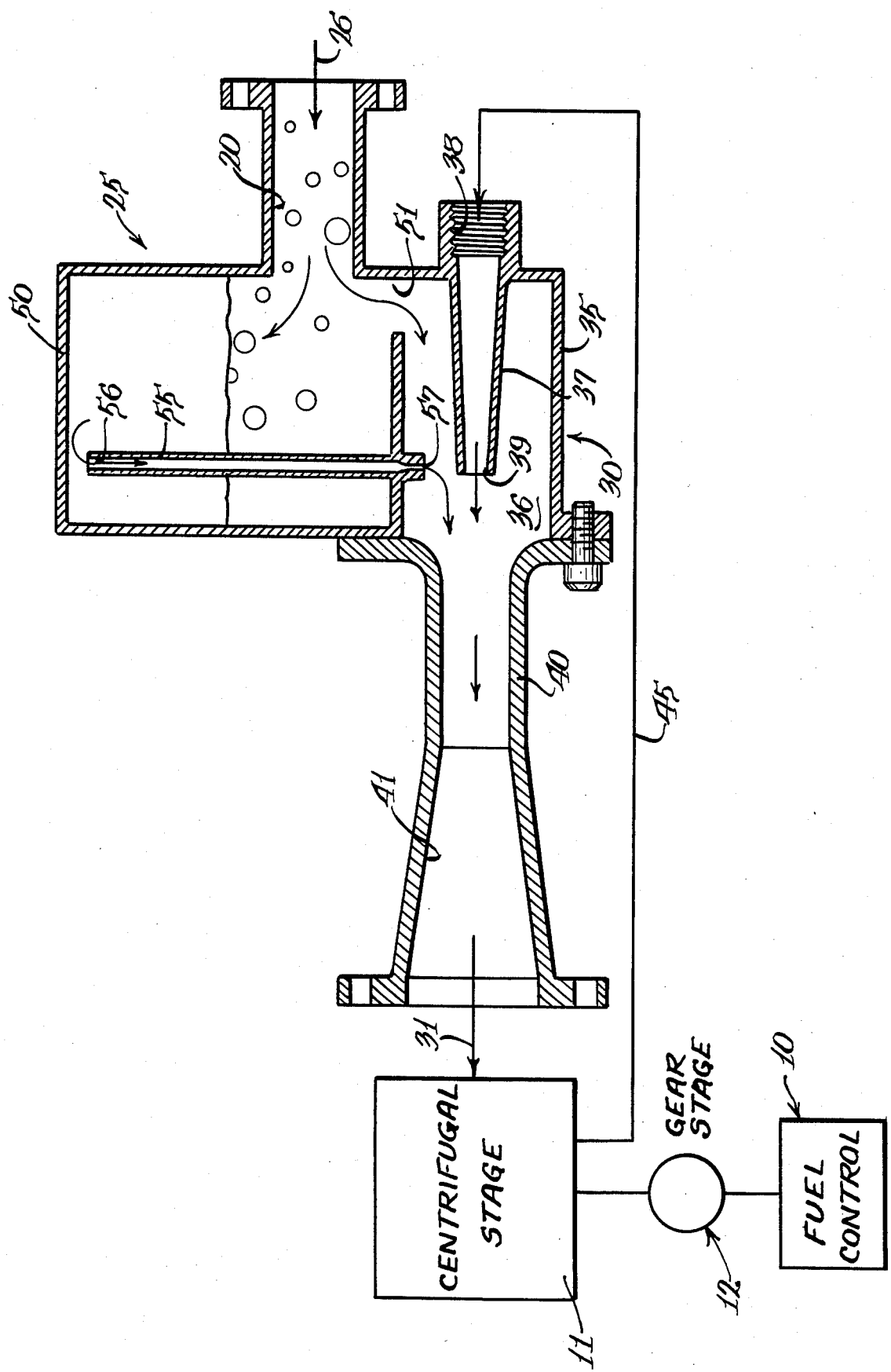

FUEL SYSTEM BUBBLE DISSIPATION DEVICE

This application is a continuation of application Ser. No. 488,042, filed Apr. 25, 1983, now abandoned.

DESCRIPTION

1. Technical Field

The present invention relates to a fuel system bubble dissipation device for removing air and vapor from a fuel line supplying fuel to an aircraft engine and, more particularly, to a structure having a bubble accumulation chamber of a size to hold the largest anticipated air bubble as well as fuel and an ejector which increases the pressure of fuel flowing from the bubble accumulation chamber and draws air and vapor stored in the bubble accumulation chamber for addition to the fuel flow at a controlled rate which will not cause pump loss of prime.

2. Background Art

It is common in fuel supply systems for aircraft engines to feed the fuel from a fuel tank with a boost pump mounted in the tank and the fuel flows to a fuel control with the pressure of the fuel being built up by a two-stage fuel pump having a centrifugal pump as a first stage and a gear pump as the second stage. For proper operation of the fuel system, it is important to avoid cavitation and/or loss of prime at the centrifugal pump which can occur if there are large air bubbles or excessive quantities of vapor in the fuel.

In a suction fuel system (no tank boost) for an aircraft engine, it is more probable to have air build up in the fuel line during low flow. On application of full power, this air may be transported as a large bubble which, if it reaches the centrifugal pump, will cause a loss of fuel flow to the engine.

Previous systems have had various structural arrangements attempting to avoid this problem, such as the use of a centrifuge as shown in the Powell et al Pat. No. 2,901,031 and the use of a chamber located at the high point of a fuel line, as shown in Heinecke et al U.S. Pat. No. 3,387,644. In the Heinecke et al patent, an educator connected in parallel with the main fuel line is connected by a passage to the chamber at the high point in the fuel line to draw air therefrom and add it to fuel being returned to the main fuel line.

The prior art does not disclose a system with minimal components and, therefore, minimal weight which stores a large air bubble in a bubble accumulation chamber and which utilizes the primary system ejector (jet pump) connected directly into the fuel line for drawing the air bubble out of the chamber at a controlled rate and mixing the air with the fuel flowing through the ejector.

DISCLOSURE OF THE INVENTION

A primary feature of the invention disclosed herein is to provide a bubble dissipation device for a fuel system having an ejector with a fuel flow passage through which fuel flows and a nozzle, a bubble accumulation chamber having passage means at a lower end connected to the fuel flow passage and a fuel inlet above the level of said passage means, and a bubble evacuation passage communicating with the upper end of the bubble accumulation chamber and the fuel flow passage of the ejector whereby pressurized fuel flow through the nozzle draws air and vapor from an upper end of the bubble accumulation chamber at a controlled rate and adds such air and vapor to the fuel flowing through the fuel flow passage.

In carrying out the foregoing, the bubble dissipation device has the bubble accumulation chamber of a size to define a reservoir for fuel adequate to maintain flow through the fuel flow passage as an air bubble enters into the bubble accumulation chamber and to hold an air bubble separated from and above the fuel in the chamber, and the bubble evacuation passage is of a size to control the rate at which air and vapor are drawn from the upper end thereof.

With the new and improved structure disclosed herein, a conventionally known system having an ejector in advance of a centrifugal pump has a bubble accumulation chamber associated with the fuel line into which the fuel flows and passage means connect into the ejector whereby a large air bubble can be diverted into the upper end of the bubble accumulation chamber while the main fuel flow continues through the ejector. The air and vapor are drawn off from the upper end of the bubble accumulation chamber at a controlled rate through a bubble evacuation passage communicating between the upper end of the bubble accumulation chamber and the flow passage through the ejector. With this system, the air and vapor drawn off from the upper end of the bubble accumulation chamber are mixed with the total fuel flow in the system.

BRIEF DESCRIPTION OF THE DRAWING

The FIGURE is a schematic view of the fuel system with certain portions of the fuel flow through a fuel line indicated by flow arrows and with parts of the structure shown in vertical section.

BEST MODE FOR CARRYING OUT THE INVENTION

The fuel system includes a fuel line which extends from a fuel tank (not shown) to a fuel control, indicated generally at 10. In advance of the fuel control, the fuel is pressurized to a desired level by a two-stage engine-driven pump having a first centrifugal stage, indicated generaly at 11, as provided by a centrifugal pump and a second gear stage, indicated generally at 12, as provided by a gear pump.

The fuel is delivered through the fuel line from the fuel tank to an inlet 20 of a bubble accumulation chamber, indicated generally at 25, with this fuel line flow being indicated by the arrow 26. The fuel flows from the bubble accumulation chamber 25 to an ejector, indicated generally at 30, and flows from the ejector 30 to the centrifugal stage 11 through a part of the fuel line indicated by the flow arrow 31.

The ejector 30 has an ejector casing 35 defining a fuel flow passage 36. A nozzle 37 is located within the fuel flow passage and has an inlet 38 through a wall of the casing and an outlet 39 within the fuel flow passage. The ejector 30 includes a cylindrical member 40 defining a mixing tube and which communicates with an outwardly-flared section 41 thereof. Fuel leaving the outwardly-flared portion 41 flows through the fuel line to the centrifugal stage 11 which has an inducer associated therewith.

The ejector 30 functions to pressurize the centrifugal stage inlet and to mix the fuel entering the fuel flow passage into a homogeneous bubbly froth. The impeller of the centrifugal pump provides a head rise to the fuel to meet the NPSP requirements of the gear stage.

The nozzle 37 is provided with fuel under pressure through a flow line 45 which is shown as extending from the centrifugal stage 11 to the inlet 38 of the nozzle. This source of pressurized fuel can alternatively be taken from some other location downstream of the centrifugal stage 11, such as the fuel control bypass or gear stage discharge.

If a large air bubble were to travel directly through the ejector and enter the centrifugal stage, the centrifugal stage could lose its prime with subsequent loss of fuel flow to the aircraft engine. When the aircraft engine is used in helicopter applications, the possibility for a large air bubble to occur in the fuel system is more likely. This air build-up can occur during low fuel flow and, upon application of full power to the engine requiring maximum fuel flow, this air may be transported as a large bubble into the fuel pump and, particularly, the centrifugal stage, causing it to lose prime. As an example of such an air bubble, if the fuel line has a three-quarter inch internal diameter and the air bubble in the line is twelve inches long, this represents a volume of in excess of five cubic inches.

In order to avoid loss of prime, the bubble accumulation chamber has been added to the system and is of a size to function as a fuel reservoir whereby fuel can continue to flow to the engine, even as a large air bubble enters the chamber and also to store a large air bubble above the level of fuel in the reservoir. This air is gradually drawn off by the ejector and mixed with the total fuel flow through the fuel line.

The bubble accumulation chamber 25 has a casing 50 with a vertical height and which can be of any deired shape, such as cylindrical. A passage means 51 connects the lower end of the chamber to the fuel flow passage 36 of the ejector. The inlet 20 to the bubble accumulation chamber is above the passage means 51 whereby, as an air bubble enters the bubble accumulation chamber, it will rise to the upper end thereof.

Passage means and, more particularly, a bubble evacuation passage extends between the upper end of the bubble accumulation chamber 25 and the fuel flow passage 36 of the ejector. More particularly, this passage means is defined by a tube 55 extending upwardly into the upper end of the bubble accumulation chamber and having an entry end 56 through which air and vapor can be drawn and a lower end 57 with a restriction opening into the fuel flow passage 36. The restriction is sized to provide a controlled rate of flow of air and vapor through the passage means whereby the air and vapor will be gradually drawn off from the upper end of the accumulation chamber.

With the construction and orientation of the bubble accumulation chamber 25 and the ejector 30, it will be seen that the aircraft embodying the structure can be at various attitudes, with there still being solid fuel flow through the inlet 20 to the ejector and collecting of air and vapor at the upper end of the bubble accumulation chamber 25.

The bubble dissipation device associates a bubble accumulation chamber with an ejector functioning in the main fuel line to avoid pump loss of prime problems arising from the existence of a large air bubble in the fuel.

I claim:

1. A bubble dissipation device for a fuel system wherein fuel is delivered through a fuel line from a fuel tank to a fuel control with the pressure of the fuel being progressively increased by components including at least one pump stage and an ejector in advance of the pump stage, said ejector having an ejector casing with a wall defining an elongate tubular flow passage which forms a portion of said fuel line to have all of the fuel flow through said tubular flow passage in flowing from the fuel tank to the fuel control, a nozzle positioned entirely within the tubular flow passage and spaced from said wall to permit fuel flow therepast and exteriorly thereof, said nozzle having an inlet and an outlet with said inlet connected to said pump stage to receive fuel under pressure continuously from the pump stage, a bubble accumulation chamber adjoining and at a level above said ejector casing and operatively connected to said fuel line in advance of said ejector casing, said bubble accumulation chamber being of a size to function as a fuel reservoir and hold an air bubble contaiing vapor above the level of fuel therein and having an outlet adjacent the bottom thereof operatively connected to said tubular flow passage in said ejector casing at an inlet end thereof, a bubble accumulation chamber inlet above the level of said bubble accumulation chamber outlet whereby fuel can flow through the bubble accumulation chamber from the inlet to the outlet thereof with a bubble in the fuel rising above the fuel level in the bubble accumulation chamber, and a bubble evacuation passage having an inlet near the upper end of the bubble accumulation chamber and an outlet through said wall of the ejector casing adjacent and radially outward of the nozzle outlet and having a flow restriction therein to control the rate of withdrawal of said air and vapor from said upper end of the bubble accumulation chamber for mixing the air and vapor at a controlled rate with the fuel flowing through the tubular flow passage of the ejector casing and past the nozzle.

2. A fuel system for delivering fuel from a fuel tank to a fuel control for an aircraft engine including a fuel pump having a centrifugal pump, a fuel line connected to said centrifugal pump and having an ejector therein for increasing the pressure of fuel supplied to said centrifugal pump from said fuel tank, said ejector having an ejector casing with a wall defining a fuel flow passage through which all fuel flows to the centrifugal pump and a nozzle within the ejector casing and in the fuel flow passage and said nozzle having an outlet end intermediate the ends of the ejector casing, and a continuously open fluid line from the fuel pump to said nozzle to continuously deliver fuel under pressure to said nozzle for flow out of the outlet end thereof and mixing with the fuel flowing through said fuel flow passage and past the nozzle, the improvement comprising: a bubble accumulation chamber of a size to define a fuel reservoir and hold an air bubble containing vapor above the fuel level in the bubble accumulation chamber, said bubble accumulation chamber being contiguous with and at a level higher than said ejector casing and having an outlet adjacent the bottom thereof opening to an inlet end of said fuel flow passage in the ejector casing and having an inlet at a higher level connected into the fuel line whereby there is a level of fuel in the bubble accumulation chamber and air bubble containing vapor in the fuel flowing to the ejector can rise to the upper end of the bubble accumulation chamber; and means defining a bubble evacuation passage having an upper inlet end communiating with said upper end of the bubble accumulation chamber and a lower outlet end opening through said wall to the fuel flow passage in the ejector casing radially outwardly of an adjacent to the outlet end of said nozzle and downstream of the outlet from the bubble accumulation chamber, said bubble evacuation passage having a restriction therein of a size to permit said air and vapor to be only gradually drawn from said upper end of the bubble accumulation chamber at a controlled rate and mix with all the fuel flowing through the fuel flow passage from the fuel tank to the centrifugal pump.

3. A bubble dissipation device for a fuel system wherein fuel is delivered through a fuel line from a fuel tank to at least one pump stage and an ejector in advance of said pump stage, said ejector having an ejector casing with a fuel flow passage and a nozzle positioned in the fuel flow passage, a continuously open fluid line from said pump stage to said nozzle to continuously deliver fuel under pressure to said nozzle, said ejector casing being operatively connected into the fuel line to have all the fuel flowing to said one pump stage from the tank flow through the fuel flow passage in the ejector casing, a bubble accumulation chamber operatively connected into said fuel line in advance of and above said ejector casing, said bubble accumulation chamber having an outlet adjacent the bottom thereof operatively connected to said ejector casing for direct flow of fuel from the tank to said ejector casing, and means communicating with the upper end of the bubble accumulation chamber and having a lower end opening to the fuel flow passage exterally of the nozzle and defining a passage of a size to draw gas from said upper end of the bubble accumulation chamber at a controlled rate and which is mixed with the total fuel flow through the fuel flow passage.

* * * * *